Figure 1:
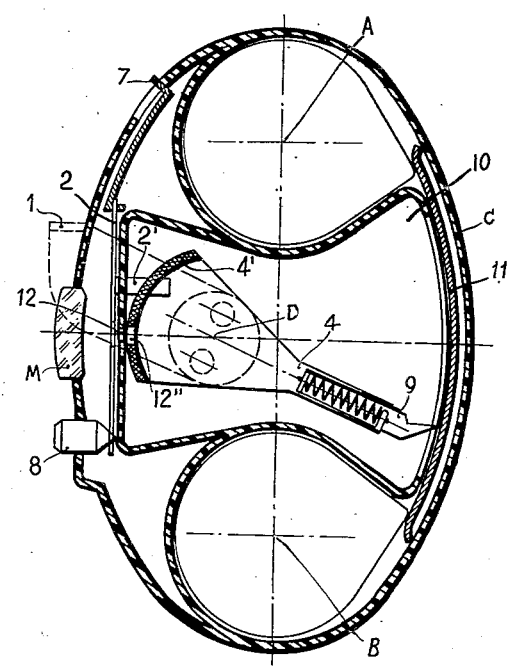

Feb. 26, 1952           G. DURST           2,587,447

CAMERA HAVING BLADE AND COVER BLIND SHUTTER

Filed May 13, 1947

Patented Feb. 26, 1952

2,587,447

UNITED STATES PATENT OFFICE 2,587,447

CAMERA HAVING BLADE AND COVER BLIND SHUTTER

Giulio Durst, Bolzano, Italy

Application May 13, 1947, Serial No. 747,723
In Italy March 1, 1947

1 Claim. (Cl. 95—60)

The present invention relates to cameras and more particularly to a camera of small compact dimensions such as a candid camera.

Conventional cameras used heretofore divide essentially in two classes: the complicated and very expensive cameras provided with elaborate mechanical devices of the utmost precision, operated by very few controlling members, the other class comprising the simpler and cheaper cameras, that have however either various different controls or else do not offer such guarantees in the operation of its various members as would be desired for any camera.

It is an object of my present invention to provide a camera wherein the cocking of the shutter and the forward movement of the film is effected by one single operation.

It is a further object of my invention to provide a camera wherein one single operation simultaneously effects cocking of the shutter, the forward feeding movement of the film and the forward movement of a registering device such as an indicator of the number of pictures taken.

In a more specific way an object of my invention is to provide a camera in which the several effects indicated are accomplished by one single operation and which nevertheless is small in size and can be manufactured at a low price. In this direction it is a further object of my invention to provide a greatly simplified form of simultaneous shutter actuation, film position indicator and film moving mechanism.

With the above objects in view my invention mainly consists of an exposure shutter, means for movably supporting said shutter, spring means acting on said shutter, a swing lever pivoted to a stationary part of the camera for moving said shutter toward a cocked position, catch means pivoted to a stationary part of the camera for locking said shutter in said cocked position, an actuator secured to a stationary part of the camera for releasing said catch means, a light opening provided in said shutter for admitting light to a light-sensitive element in one position of said shutter, a wall portion associated with said swing lever covering the said light opening, and an aperture provided in said wall portion adapted to be brought into alignment with said light opening in one position of said spring lever.

A particularly preferred embodiment of my invention consists of an exposure shutter, means for movably supporting said shutter, spring means acting on said shutter, a swing lever pivoted to a stationary part of the camera for moving said shutter toward a cocked position, first catch means pivoted to a stationary part of the camera for locking said shutter in cocked position, second catch means pivoted to a stationary part of said camera for locking said shutter in cocked position after its release from said first catch means, means for normally locking said second catch means in inoperative position, common actuator means secured to a stationary part of the camera for successively releasing said first and second catch means, a light opening provided in said shutter for admitting light to a light-sensitive element in one position of said shutter, a wall portion associated with said swing lever covering said light opening, and an aperture provided in said wall portion adapted to be brought into alignment with said light opening in one position of said spring lever.

Figure 2:
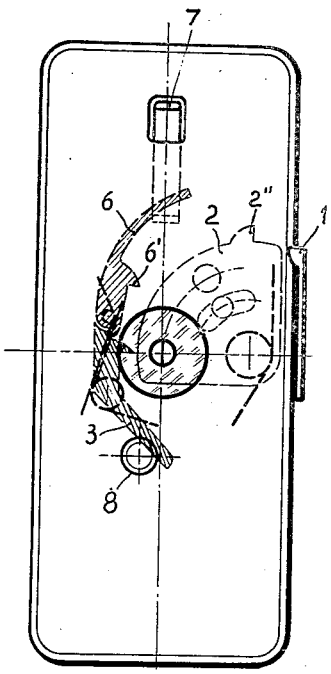
Figure 3:
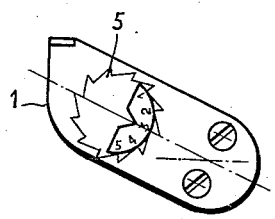

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 shows a vertical section through the camera as seen from the side;

Fig. 2 a front view of the same wherein, in dotted lines, are shown also some of hidden internal parts; and Fig. 3 shows in detail the operating lever with attached ratchet wheel of the registering device of my camera.

Figure 4:
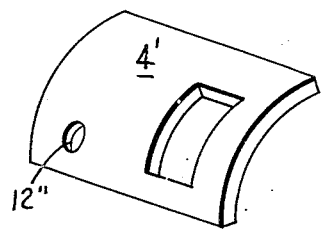

Fig. 4 shows a detail of the camera structure.

In reference to the embodiment shown in the drawing, the camera, according to the invention, comprises an outer casing C within which the "camera obscura" 10 is limited by suitable walls and whose front wall is provided with a hole 12 for letting in the light rays which are to impress the image on the film, said film sliding in a slot 11 in close proximity with the back wall of casing C. The operating lever 1 that swings on axis D is solidly connected to a sector 4 provided in its front part with a part cylindrical wall 4' wherein is cut a hole 12" which can be brought in alignment with hole 12. Cylindrical wall 4' is provided with an elongated slot to one side of openings 12", as shown by the dotted lines in Fig. 1 which coincide with the lines indicating lever 1 and as shown in Fig. 4. Said sector 4 extends at the back in a toothed member 9 placed under the action of a spring and whose teeth can engage the side holes of the film for shifting the latter when required. The shutter 2 moves behind the lens M in immediate proximity to the hole 12 of the "camera obscura." Said shutter is provided with a pin 2' upon which acts the upper edge of the elongated opening of wall 4' for moving the shutter and a tooth 2' to permit said shutter to be latched in cocked position by the action of lever 3. Pin 2' moves in an arcuate slot formed in the front wall of chamber 10, as shown in Fig. 2. On the lever 3 acts the press button 8, which, on being pressed down, moves the lever 3 against the action of a spring and consequently releases the lever from tooth 2" of shutter 2, which, on being freed, will return to its initial position under the action of a spring, thus uncovering, by means of the hole in shutter 2 shown in Fig. 1, for an instant the hole 12 of the "camera obscura," while hole is subsequently covered by the shutter 2, as shown in Fig. 2.

The operations just described are those for obtaining an instantaneous picture (snap-shot). Should a time-exposure be desired, then lever 6 and the relative controlling slide 7 will enter into action.

While taking snap-shots, slide 7 prevents lever 6 from moving; on shifting downwards slide 7, lever 6 capable of engaging lever 3, as shown clearly in Fig. 2, is left free to swing. Now, supposing the device already loaded, the pressing of button 8 causes lever 3 to be shifted backward in correspondence to its extremity engaged with lever 6, said lever 6 being free to advance in a contrary direction and to stop, by means of its own tooth 6', the motion of shutter 2. In such position of shutter 2, the hole thereof is in alignment with hole 12 of the "camera obscura" so that the light rays pass through the aligned apertures, until press-button 8 is released, whereby lever 3 shifts again compelling lever 6 to move backward thus releasing shutter 2 which returns to its normal non-loaded position and covers the hole 12.

Both after a snap-shot and after a time-exposure, at each lowering of the operating-lever 1 for cocking the shutter, teeth 9 of sector 4 will of course shift the film forward by a length corresponding to the picture taken, unreeling one of the reels and reeling upon the other a corresponding film length, the two reels revolving respectively around axes A and B.

In order to set the camera for the taking of time pictures, the shutter is cocked as before. Then slide-lock 7 is moved downward and arm 6 is thus permitted to move into operative position, that is, toward the right as seen in Fig. 2. This movement occurs under the action of spring 17. When the stud 8 now is actuated so as to swing bell crank 3 into inoperative position projection 2" after being released from catch 3" will be caught by catch 6'. In this position the opening 19 of the shutter is in alignment with openings 12 and 12" and an exposure therefore takes place. The shutter will remain in this position as long as stud 8 remains depressed. By then releasing stud 8, bell crank 3 is permitted to swing back into its normal operative position. The front portion of the shorter arm of the bell crank thereby engages the rear end of arm 6 and swings the latter back into inoperative position so that projection 2" of the shutter is freed from catch 6'. This then terminates the exposure.

During each depression of the swing lever 1 the ratchet wheel 5 which is supported on the lever will move therewith. When the swing lever then is returned to its original position, the ratchet wheel remains in attained position. The cogs of the ratchet wheel are so spaced that during each oscillation of swing lever 1, the ratchet wheel is rotated so as to advance the indexing device associated with the ratchet wheel by one of the circumferentially arranged numerals. In this manner the advancement of the film to another exposure space is indicated.

It will be understood that each of the elements described above, or two or more together, may also find a useful application in other types of cameras differing from the types described above.

While I have illustrated and described the invention as embodied in cameras, I do not intend to be limited to the details shown, since various modifications and structural changes may be made without departing in any way from the spirit of my invention.

As is clearly disclosed by a preceding specification, the characteristic feature of the camera, is that of allowing a single operating member, namely lever 1, combined with other simple members and with a single motion, to effect the cocking of shutter 2, the advancement of the unexposed film and of the reading on the counter.

It is obvious that the shape of the different members of the camera and all details in design may vary as eventually required without thereby exceeding the limits of the present invention.

Without further analysis, the foregoing fully reveals the gist of my invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claim.

What I claim as new and desire to secure by Letters Patent is:

A camera, comprising in combination, an exposure chamber having a front wall formed with an opening and an arcuate slot spaced from said opening; a shutter member pivotally mounted on said front wall about the center of curvature of said arcuate slot and having a pin extending through said slot into said exposure chamber, said shutter being formed with an opening which passes over said opening in said front wall of said exposure chamber as said shutter moves between its cocked and uncocked positions; releasable latch means mounted on the camera for releasably holding said shutter in its cocked position; spring means operatively connected to said shutter for urging the same into its uncocked position; an arcuate part cylindrical wall member mounted within said chamber adjacent to said front wall thereof for turning movement about an axis of rotation extending parallel to said front wall and coinciding with the axis of said part cylindrical wall member, the latter being formed with an elongated slot located about said pin of said shutter, said arcuate member also being formed with an opening aligned with said opening in said front wall of said chamber when said arcuate member is in a position of rest, whereby, upon pivotal movement of said arcuate member, an edge of said elongated slot thereof engages said pin of said shutter to move said shutter from its uncocked to its cocked position, and whereby, when said arcuate member has returned to its position of rest, said aligned openings of said arcuate member and said front wall of said chamber are covered by said shutter and only uncovered by the passing of said opening of said shutter over said aligned openings when said shutter is released.

GIULIO DURST.

REFERENCES CITED

The following references are of record in the file of this patent:

UNITED STATES PATENTS

| Number | Name | Date |
|---|---|---|
| 510,805 | Lewis | Dec. 12, 1893 |
| 1,430,582 | Pittman | Oct. 3, 1922 |
| 1,516,496 | Owens | Nov. 25, 1924 |
| 1,909,597 | Thompson | May 16, 1933 |
| 2,111,425 | Goldhammer | Mar. 15, 1938 |
| 2,365,690 | Fassin | Dec. 26, 1944 |
| 2,367,195 | Bolsey | Jan. 16, 1945 |
| 2,395,828 | Kallusch | Mar. 5, 1946 |

FOREIGN PATENTS

| Number | Country | Date |
|---|---|---|
| 782,157 | France | Mar. 11, 1935 |
| 479,135 | Great Britain | Feb. 1, 1938 |